May 22, 1934.                R. V. DERRAH                1,959,615
                              FRUIT SQUEEZER
                            Filed April 27, 1932
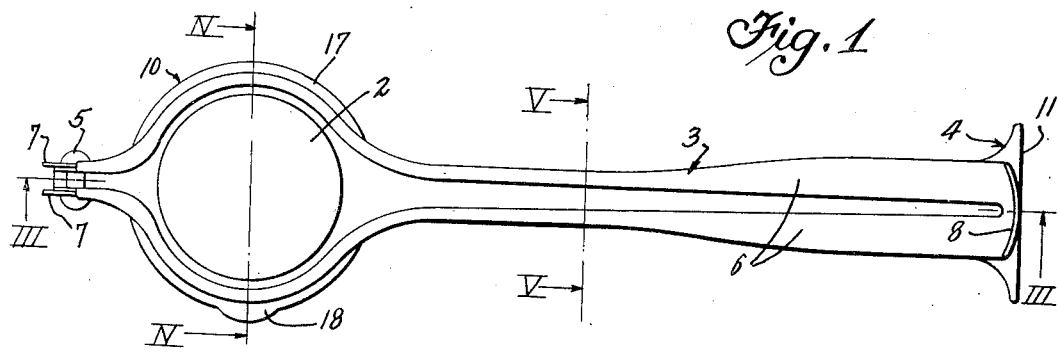
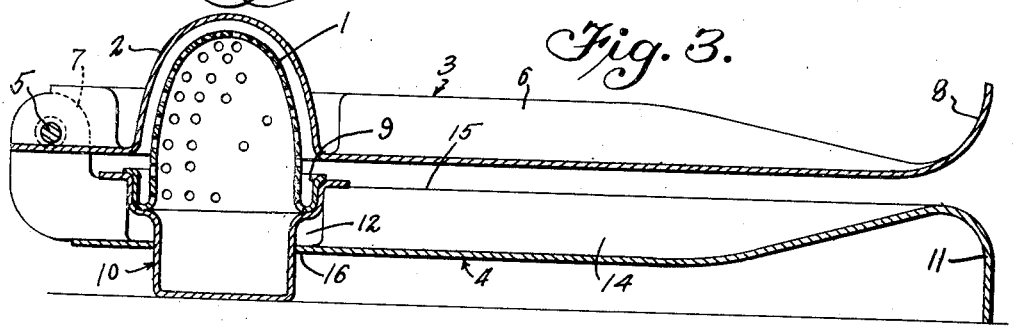
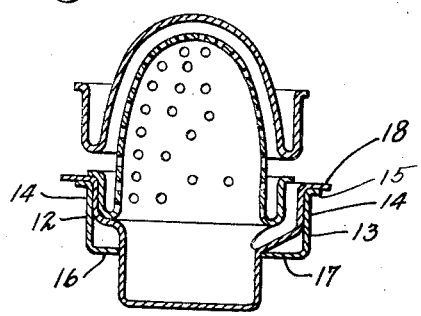
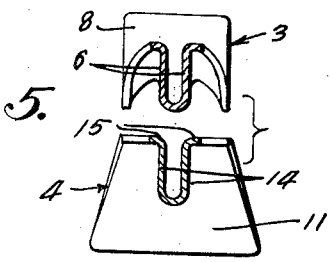
Inventor
Robert V. Derrah
By Lyon & Lyon
Attorneys Patented May 22, 1934

1,959,615

UNITED STATES PATENT OFFICE 1,959,615

FRUIT SQUEEZER

Robert V. Derrah, Beverly Hills, Calif.

Application April 27, 1932, Serial No. 607,786

4 Claims. (Cl. 100—41)

This invention relates to methods of and means for extracting juice from fruit, particularly citrus fruit such as lemons, oranges, and grapefruit.

An object of the invention is to quickly and easily extract substantially all of the juice from a fruit.

Another object is to extract the juice from a fruit without removing the pulp or fiber.

Still another object is to provide a device that is adaptable to receive fruit of widely different sizes.

Heretofore, to the best of my knowledge, all the devices used for extracting juice from oranges, lemons or grapefruit have rotated the fruit in contact with a corrugated core member which crushed or tore the fibrous tissues of the fruit away from the skin and mixed them with the juice. Thereafter, if a clear juice was desired, it was necessary to strain out the pulp or fiber. In addition, the methods of the prior art are objectionable in that considerable work is involved in rotating the fruit against the core member used to break down the tissues and discharge the juice. Attempts have been made to overcome this disadvantage by providing a source of power such as an electric motor to do the work of rotating the core against which the fruit is held. However, such devices are relatively expensive, and for that reason, have not gone into general household use.

In accordance with the present invention the disadvantages of old type juice extractors are eliminated by providing a pair of squeezing members of similar configuration adapted to receive half of a fruit and compress it sufficiently to break down the tissues and force out substantially all of the juice, without rotating the fruit against a corrugated core. Since, when rotary motion is not resorted to, a relatively great pressure is required to remove all the juice, I mount the members on a pair of hinged lever arms, the members being positioned relatively close to the hinge or fulcrum and the arms or handles extending therebeyond for an appreciable distance to give a substantial multiplication of force.

A detailed description of the exact construction and mode of employing a squeezer in accordance with the invention follows:

In the drawing:

Figure 1 is a plan view of the device;

Figure 2 is a plan view of the lower cup and handle with the upper cup and handle removed;

Figure 3 is a longitudinal elevational sectional view in the plane III—III of Figure 1;

Figure 4 is a lateral elevational sectional view in the plane IV—IV of Figure 1; and Figure 5 is a horizontal sectional view in the plane V—V of Figure 3.

Referring to the drawing, my squeezer comprises a perforated inner cup 1 and a solid outer cup 2 of similar shape so that the inner cup enters and nests within the outer cup. Cups 1 and 2 are supported by handles 3 and 4 respectively, these handles being hinged together at one end by a pin 5 that serves as a fulcrum.

The device may be constructed in various ways, but I prefer to make it of sheet metal stamped into suitable form, as by this construction it is possible to manufacture the device in large quantities at relatively low cost.

If stamped construction is employed, as shown, the outer cup 2 and its associated handle 3 may be stamped from a single piece. To give the necessary rigidity, the outer edge of the cup 2 and handle 3 are provided with upwardly extending outer flanges 6. This provides a central handle section of approximately U-shape which is relatively strong and capable of resisting the heavy bending stresses imposed upon it when the outer ends of the handles are forced together. At the hinge end of the cup 2 the two vertical walls of the U-shaped handle are perforated to receive the hinge pin 5. At the opposite end of handle 3 the U-section is gradually tapered out until the end of the handle is substantially flat as shown at 8 in Figure 3. This flattened end is then bent outwardly as shown to serve as a stabilizing support or rest when the device is employed in inverted position with the outer cup 2 resting upon a table top.

The assembly including the lower handle 4 and the inner cup 1 is preferably made in several pieces; thus, I have shown the inner cup 1 as an individual member having an upwardly extending flange 9 at its lower edge. The cup 1 nests within a receptacle 10 which in turn is mounted in the lower handle 4. The latter is U-shape in cross section throughout its middle portion, as shown in Figure 5, and the U-section is gradually tapered out to a flat end 11, which is bent down to form a leg or rest for the device when it is set upon a table. The end 8 is broadened out like a fish tail to give a broad supporting base.

The lower handle 4 is made relatively wide adjacent the hinge end, as shown in Figures 2 and 4, and the center material punched out to leave a circular aperture in which receptacle 10 is positioned. As shown in Figure 4, each side 12 and 13 of the cup supporting portion of the handle comprises a substantially vertical wall 14 having a narrow outwardly projecting rim 15 at the top, and wider and inwardly projecting flanges 16 and 17 at the bottom. At the hinge end the walls 14 of handle 4 are extended upwardly to constitute ears 7. These ears extend upwardly on either side of the hinge end of the upper handle 6 and have apertures therein registering with the aperture in the handle 6 for engagement with the hinge pin 5.

Receptacle 10 is retained between the sides of the cleft lower handle 4 by friction (it may be welded or brazed in place if so desired, or may be locked in any desired manner), and the inner, perforated cup 1 fits snugly within the upper edge of receptacle 10 so that it is normally retained in position by friction but can be readily removed when it is desired to cleanse the device. It will be observed that the upwardly extending flange 9 on cup 1 forms an annular trough extending around the base of cup 1; this retains any seeds or pulp that may be loosened from a fruit.

In use, the device is opened by raising the upper handle 6 to substantially a vertical position; the fruit from which the juice is to be extracted is then cut in halves and one of the halves placed cut-face downward upon the center of the inner cup 1. The outer cup 2 is then closed upon the fruit by forcing the outer end of the handle 6 downward. This movement, of course, compresses the fruit between the cups 1 and 2 and forces the juice therefrom through the perforations in cup 1 into the receptacle 10. Because of the leverage obtained, it is relatively easy to close the outer cup 2 upon the inner cup 1 and compress the fruit until the handles are quite close together; thereafter the operator can enclose both the upper and lower handles within his hand, and with little effort apply a greater final force to completely compress the fruit between the cups 1 and 2 and extract the last drop of juice; then the upper handle 6 is lifted, the dry fruit skin and pulp removed, another half of fruit inserted, and the process repeated.

The receptacle 10 may be made in any desired size, but it is convenient to proportion it to have a capacity of about a half-pint. To empty the receptacle 10 the latter is provided with a lip 18, the wall of the receptacle being bent out at this point to leave a free space between the wall of the receptacle and the edge of the flange 9 on cup 1. By tipping the device, the juice may be poured out of receptacle 10, past lip 18, without removing the cup 9.

Although it is usually desirable to operate the device as described with the handle 4 and the cup 10 in lowermost position, the device may also be operated in the reverse position, that is, the handle 6 and the outer cup 2 in lowermost position resting upon a table top or the drain board of a sink. Under these conditions the cut fruit is placed with its cut face uppermost in the outer cup 2; thereafter, when the inner cup 1 is forced down into the fruit the juice passes through the perforations in the cup 1 and accumulates within cup 1. The accumulated juice can be removed by lifting the entire device with the fruit in it and turning it through 90° so that the juice can drain down and out of the pouring lip of the receptacle 10.

Although the exact shape and size of the inner and outer cups 1 and 2 respectively may be varied between wide limits, I prefer to shape them in approximately the outline of a paraboloid or hyperboloid since this permits the cup members to nest more perfectly at different degrees of openings whereby the device automatically accommodates itself for use with fruits having skins of different thicknesses. It will be observed that if the inner and outer cups were semi-spherical in shape that the distance between the cups adjacent the open side of the upper cup 2 would be fixed. The device would then excessively crush the marginal portions of thick skinned fruit and would incompletely crush those portions of extremely thin skinned fruit. However, with the cups tapered outwardly over their entire crushing faces, they nest uniformly in different positions of opening, and thus automatically adjust themselves to fruits having skins of different thicknesses.

The device described is particularly meritorious for a number of reasons. In the first place, it can be operated very rapidly, and juice can be extracted from oranges, grapefruit, or lemons much more quickly than with devices which necessitate the rotation of the fruit against a corrugated core. In the second place, the juice obtained with the device described is clear, containing substantially no pulp whatever, and therefore need not be strained; even seeds are retained as the apertures in the inner cup 1 are too small to permit them to pass therethrough. The elimination of any need for straining the juice results in a further saving of time. In the third place, since the device can be constructed entirely of sheet metal as described, it can be manufactured at relatively low cost, and can be sold at a price that places it within the reach of practically every household.

It has been observed that juice pressed from oranges with my device is sweeter than that obtained by rotating the fruit against a corrugated core. I attribute this to the fact that my device does not scrape away, or otherwise remove from the orange skin, any of the pulp or tissues containing bitter oils or juices.

I claim:

1. A fruit squeezer comprising an inner cup and an outer cup adapted to nest together, and a pair of levers hinged together at one end for moving said cups into and out of nested position, said outer cup being integral with one of said levers and being of sheet metal, a portion of the said one lever being of channel cross section to give bending strength, and the side walls of the channel extending about the base of the outer cup to constitute a reinforcing upturned flange extending thereabout.

2. A fruit squeezer comprising an inner cup and an outer cup adapted to nest together, and a pair of levers hinged together at one end for moving said cups into and out of nested position, one of said levers being of channel section throughout a substantial portion of its length to give bending strength, the base of the channel section being wider adjacent the hinge end than elsewhere and provided with a circular opening in the wider portion, and the two sides of the wider channel section being spaced apart to form a second, larger substantially circular opening thereabove, a juice receptacle comprising a cup having an outwardly extending flange at its top fitted in said second opening with said flange resting upon said sides of the channel section, said receptacle having an inwardly projecting shoulder below its upper rim and said inner cup having a base resting upon said shoulder.

3. Means as described in claim 2, further characterized in that said juice receptacle and one side of said divided channel section are provided with an outwardly extending groove therein spaced from the base of said inner cup to constitute a pouring spout.

4. A fruit squeezer comprising a pair of levers hinged together at one end and with handle portions at the other end, one of said levers being of channel cross section with outwardly extending flanges on the tops of the channel sides, to give bending strength, the channel section being wider adjacent the hinge end than elsewhere and provided with a circular opening in the base of the wider portion, and the two sides of the wider portion of the channel section being curved to form a second, larger substantially circular opening above the first opening, a juice receptacle comprising a cup having an upper portion fitting snugly within said upper circular opening and having an outwardly extending flange at its top resting upon the top edges of said channel walls, said receptacle having a lower portion of reduced diameter to fit within said lower smaller circular opening, said upper and lower sections of said receptacle being connected by an annular shoulder section, a perforated cup having an outer flange extending back upon itself fitting within the upper enlarged portion of said juice receptacle, said perforated cup being inverted with respect to said juice receptacle and its rim resting upon said annular shoulder, and a cup positioned upon said other lever handle in position to nest with said perforated cup.

ROBERT V. DERRAH.